March 28, 1933. F. M. REID 1,903,136
RADIUS ROD AND AXLE CONSTRUCTION
Filed Dec. 31, 1926 2 Sheets-Sheet 1

Inventor
Frederick Malcolm Reid
By Stuart C. Barnes
Attorney.

March 28, 1933.    F. M. REID    1,903,136
RADIUS ROD AND AXLE CONSTRUCTION
Filed Dec. 31, 1926    2 Sheets-Sheet 2
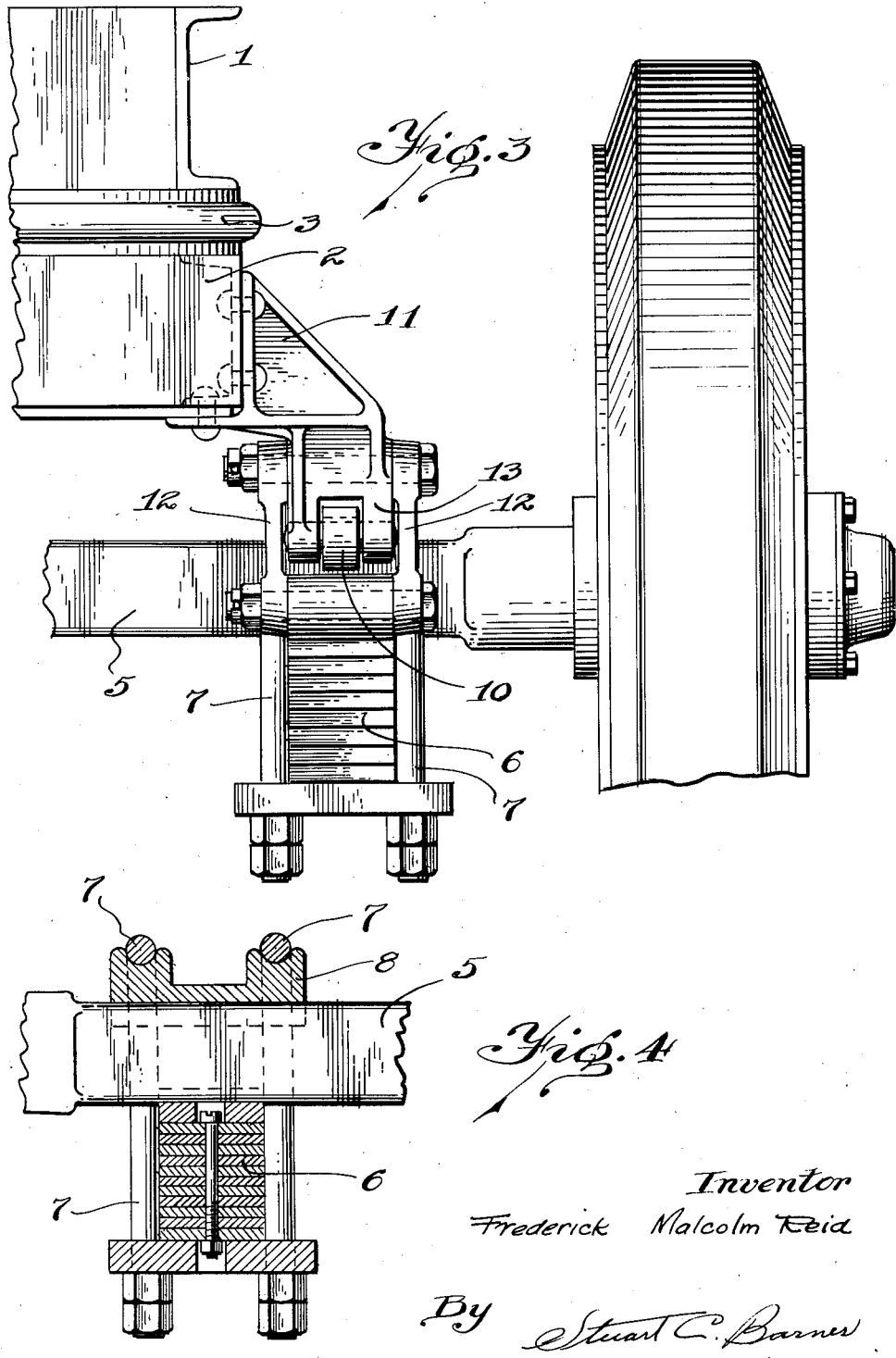
Inventor
Frederick Malcolm Reid
By Stuart C. Barnes
Attorney Patented Mar. 28, 1933

1,903,136

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

RADIUS ROD AND AXLE CONSTRUCTION

Application filed December 31, 1926. Serial No. 158,310.

The present invention relates to radius rod and axle construction, and it has to do particularly with a method and apparatus for maintaining the wheels and axles on a vehicle in proper position relative to the frame of the vehicle. More especially, the invention is concerned with keeping the axles of a vehicle of the trailer type in proper alignment where springs are used between the axles and the vehicle frame, and which are adapted to flex as the vehicle moves over an irregular surface.

A construction wherein the springs are secured at both ends to the vehicle frame so that they can move bodily with respect thereto, and which employs radius rods for joining the axle and frame to hold the axle in position, is not broadly new. The frame is usually positioned a considerable distance above the axle by reason of the arcuate construction of the springs, or the nature of the attachment of the springs to the frame, or both. The radius rod which joins the relatively low axle and relatively high frame has been disposed at an angle to the frame.

With the above described construction, the axle is caused to move in an arc relative to the frame, which is determined by the radius rod, as the springs are flexed. This causes a longitudinal movement of the axle with respect to the frame, and the greater the angle, as between the radius rod and the frame, the greater this relative longitudinal movement. Now as such a trailer is drawn along a roadway, especially when under load, there are considerable reflexing movements of the springs, and the springs on both sides of the frame do not flex evenly. The wheel on one side may meet with a depression or projection in the roadway, resulting in the flexing of the spring on that side more than the spring on the opposite side, and as a result, the axle is thrown out of alignment. One end of the axle moves to a position which is rearward of the other end.

When this occurs, there is a tendency for the trailer to run off at an angle to the intended direction of movement. The condition becomes aggravated when there is a swaying of the load from side to side so that the axle is alternately misaligned, first on one side and then on the other. This results in what is known as "snaking" which is a zigzag movement of the trailer as it is drawn forwardly. This is highly undesirable, and is one of the things that make it difficult to handle a trailer. Snaking of trailers is especially noticeable and especially undesirable, when a plurality of trailers, one hitched behind the other, are used, for some of the trailers may have a snaking movement which takes them to the left, while at the same time, others may snake to the right, and vice versa.

The present invention aims to overcome these objections, and to maintain the axles and frame in such relative position as to reduce to a minimum the possibility of longitudinal movement of an axle with respect to the frame. Accordingly, the invention contemplates a construction which affords the mounting of the radius rod in such a way that upon flexing of the springs, or upon flexing of a spring on one side of the vehicle, the position of the axle relative to the frame will not be changed, so as to cause the trailer to snake, but will permit the trailer to move forward in a straight line.

In the accompanying drawings a spring and axle construction is shown which embodies the principles of the invention.

Fig. 3 is an elevation showing the bracket construction.

Fig. 4 is a section on line 4—4 of Fig. 1.

Figure 1:
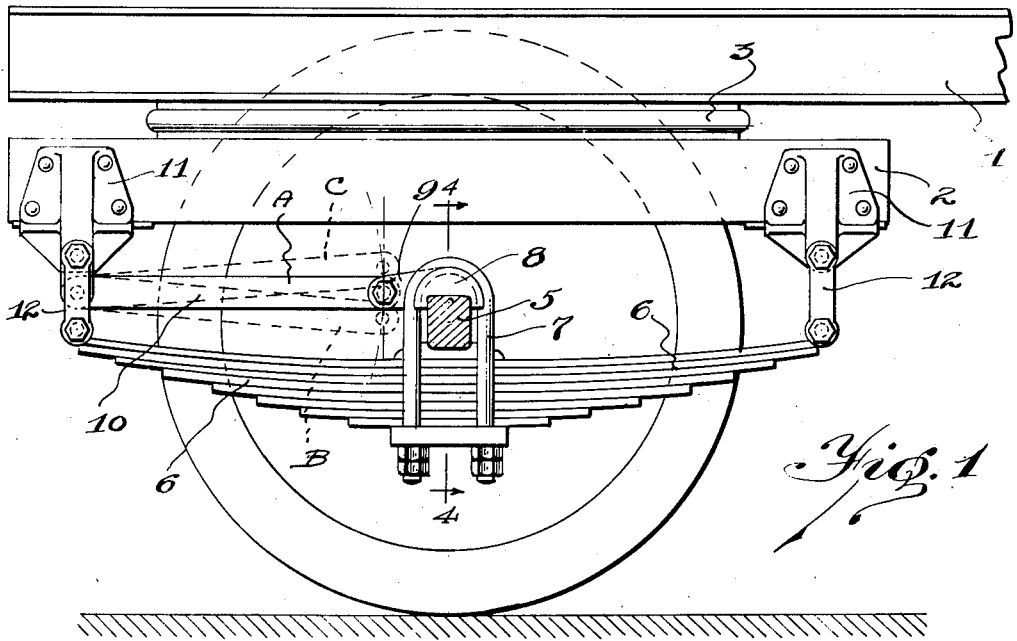
Fig. 1 is a side elevation of one end of the vehicle with the near wheel removed, showing in full lines the position of the several parts when the vehicle is under normal load.

Referring to the drawings, the frame of the trailer is indicated at 1, and the end of the frame which is shown is supported by a sub-truck 2 through the means of the fifth wheel 3. This sort of construction is desirable in reversible trailers, although of course the invention is applicable to a structure without the use of a sub-truck.

The sub-truck includes an axle 5 to which springs 6 are secured. In the present instance the springs are underslung on the axle by means of U-bolts 7. A clip-like member 8 fits over the axle and is designed to receive the bight portions of the U-bolts, and it also has an extending portion 9 to which a radius rod 10 is pivotally secured.

Secured to the sub-truck frame, near each end thereof, is a bracket 11 preferably of angle formation so as to embrace the frame both at the side and underneath, as shown in Fig. 3. Pivotally mounted to each bracket are spring shackles 12, and the ends of the springs are pivotally secured to the shackles. With this arrangement, the springs and axle are bodily movable with respect to the vehicle, but of course the parts are held in their proper position by the radius rod. By reference to Fig. 3 it will be noted that the bracket 11 has a depending part 13 which extends down between the two shackle members. The end of the radius rod is pivotally secured to this depending portion.

It will be seen that by securing the one end of the radius rod to the depending portion of the bracket and the opposite end thereof, at or near the top of the axle, that the radius rod assumes the position substantially parallel to the frame of the vehicle. By so arranging the radius rod connections, this is nicely accomplished, although of course various modifications of radius rod connections could be utilized and still effect a parallel mounting of the radius rod. Such modifications are intended to be within the scope of the invention.

Preferably, the depending portion 13 of the bracket is bifurcated with the radius rod mounted upon the pin bridging the bifurcated portions. By this arrangement, the pivoted shackles 13 are braced and strengthened against lateral movement. It is necessary to make only one of the brackets with this depending portion, although the opposite one may also be made with a depending portion so that the advantages in bracing the spring shackle attached thereto can be had.

Figure 2:
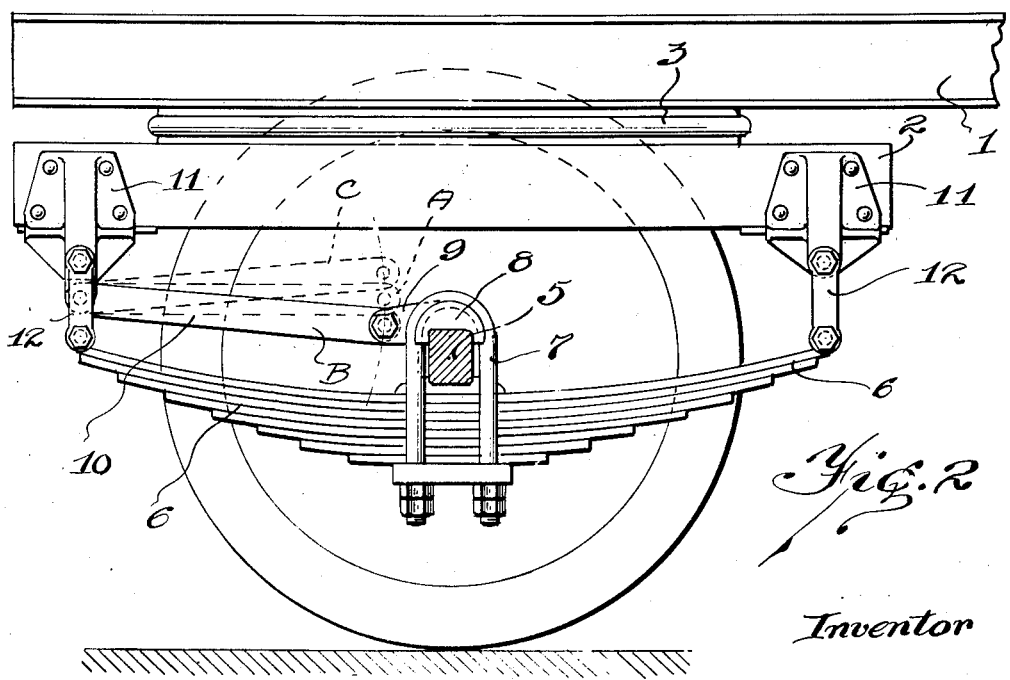
Fig. 2 is a similar view showing in full lines a position of the radius rod when the vehicle is not under load.

By further reference to Fig. 1, it will be noted that the radius rod is shown in three positions—A, B, and C. Position A is the location of the radius rod when the trailer is under normal load, the springs being flexed downwardly by reason of the load. Now as the trailer is moved along the roadway, the springs flex downwardly and then return, and the radius rod moves from side to side of the position A. Position B represents the position of the radius rod when the trailer is unloaded; and position C represents maximum or substantially maximum distortion of the springs. In Fig. 2 the radius rod is shown in full lines which is the position it assumes when the trailer is unloaded, and positions A and C are shown in dotted lines.

The capacity of the trailer, with respect to the normal load which it will carry, the tension or stiffness of the springs, and the particular position which the radius rod assumes when not under load, are all calculated so that the radius rod assumes the position parallel or substantially parallel to the frame when the vehicle is at rest and under load. This results in an arcuate movement of the axle around the pivot where the radius rod is attached to the bracket, moving both above and below the position A of Fig. 1. Where the arcuate movement is entirely below the position A, which has been the common practice heretofore, the longitudinal movement of the axle when moving in the arc, is relatively great, but in accordance with the present invention, it is reduced to a minimum. The arc of movement is represented in Fig. 1 and it will be noted that there is very little longitudinal movement of the axle.

I claim:

1. In a trailer, the combination of a trailer frame, a relatively short subframe underneath one end of the trailer frame for supporting the same, a fifth wheel between the trailer frame and the subframe whereby the subframe is dirigible, an axle, a spring connected to the axle with its two ends connected to the subframe substantially at the front and rear ends of the subframe and with its ends movable relative to the subframe, said spring being adapted to flex under load, a radius rod having one end pivotally connected to the axle and its other end pivotally connected to the subframe for positioning the axle with respect to the subframe, one end of the radius rod moving in an arc with respect to the other and upon flexing of the spring, said radius rod being so positioned that under normal load it lies substantially parallel with the subframe so that in the flexing of the spring due to road irregularities or the like the longitudinal movement of the axle with respect to the subframe is divided into forward and rearward components of the arcing movement whereby the total amount of longitudinal movement of the axle with respect to the frame is reduced to a minimum.

2. The combination with a trailer frame, a relatively short subframe underneath the trailer frame for supporting the same, a fifth wheel between the trailer frame and the subframe, an axle, a spring supported by the axle substantially at its middle portion with the spring ends substantially underlying the forward and rearward ends of the subframe, respectively, a shackle for each end of the spring pivoted to the spring and pivoted to the subframe, a radius rod having one end pivotally connected to the subframe adjacent the connection of one end of the spring to the subframe and having its other end pivotally connected to the axle for positioning the axle as regards the subframe, the spring and the locations of the pivotal connections for the for the ends of the radius rod being coordinated so that when the spring is flexed under normal load the radius rod lies substantially horizontally whereby to position the axle substantially in its most remote position from the point of connection of the radius rod with the subframe so that in the operation of the trailer over a highway, resulting in flexing of the spring, the end of the radius rod connected to the axle moves back and forth from one side to the other of said normal position in an arc whereby the longitudinal movement of the axle with respect to the subframe is divided into forward and rearward components of such arcing movement whereby the total amount of longitudinal movement of said axle with respect to the subframe is reduced to a minimum to thereby substantially prevent snaking of the trailer from side to side.

In testimony whereof I affix my signature.

FREDERICK MALCOLM REID.